United States Patent
Chen et al.

(10) Patent No.: US 11,268,853 B2
(45) Date of Patent: Mar. 8, 2022

(54) MULTICHANNEL BROADBAND HIGH-RESOLUTION SPECTROGRAPH

(71) Applicant: Fudan University, Shanghai (CN)

(72) Inventors: Liangyao Chen, Shanghai (CN); Songyou Wang, Shanghai (CN); Haibin Zhao, Shanghai (CN); Yuxiang Zheng, Shanghai (CN); Rongjun Zhang, Shanghai (CN); Yuemei Yang, Shanghai (CN); Jianke Chen, Shanghai (CN); Anqing Jiang, Shanghai (CN)

(*) Notice: Subject to any disclaimer, the term of this patent is extended or adjusted under 35 U.S.C. 154(b) by 0 days.

(21) Appl. No.: 16/932,869

(22) Filed: Jul. 20, 2020

(65) Prior Publication Data
US 2020/0348172 A1  Nov. 5, 2020

(30) Foreign Application Priority Data
Dec. 18, 2019  (CN) .......................... 201911310139.5

(51) Int. Cl.
*G01J 3/02* (2006.01)
*G01J 3/04* (2006.01)
*G01J 3/18* (2006.01)
*G01J 3/28* (2006.01)
*G01J 3/12* (2006.01)

(52) U.S. Cl.
CPC ............... *G01J 3/0208* (2013.01); *G01J 3/04* (2013.01); *G01J 3/18* (2013.01); *G01J 3/2803* (2013.01); *G01J 3/2823* (2013.01); *G01J 2003/045* (2013.01); *G01J 2003/1204* (2013.01); *G01J 2003/2813* (2013.01); *G01J 2003/2826* (2013.01)

(58) Field of Classification Search
CPC ......... G01J 2003/045; G01J 2003/1204; G01J 2003/2813; G01J 2003/2826; G01J 3/0208; G01J 3/0294; G01J 3/04; G01J 3/18; G01J 3/2803; G01J 3/2823
See application file for complete search history.

(56) References Cited

U.S. PATENT DOCUMENTS

| | | | | |
|---|---|---|---|---|
| 5,905,571 A | * | 5/1999 | Butler | G02B 26/0808 356/328 |
| 7,352,931 B1 | * | 4/2008 | Painchaud | G02B 6/02138 385/37 |
| 2008/0309936 A1 | * | 12/2008 | Krapu | G01J 3/0272 356/328 |
| 2017/0356800 A1 | * | 12/2017 | Krishnan | G03F 7/70633 |

* cited by examiner

*Primary Examiner* — Hina F Ayub

(57) ABSTRACT

The present invention discloses a multichannel broadband high-resolution spectrograph, comprising a plurality of light source incident slits, a multichannel integrated grating, a multichannel shared two-dimensional focus imaging mirror and a two-dimensional area array detector which are sequentially disposed along a light source incident or reflection line, wherein the multichannel integrated grating consists of a plurality of sub-gratings, incident light enters the corresponding integrated gratings along the light source incident slits and then is focused by the shared two-dimensional focus imaging mirror after diffraction of the integrated grating, and diffraction light in a full-spectrum region is incident onto a focal plane of the two-dimensional area array detector for detection. No any mechanical displacement part is disposed, multichannel, full-spectrum and high-speed detection and analysis is achieved, and the present disclosure has high spectrum resolution and working reliability.

10 Claims, 1 Drawing Sheet

MULTICHANNEL BROADBAND HIGH-RESOLUTION SPECTROGRAPH

TECHNICAL FIELD

The present invention belongs to the technical field of optical electronic devices, and particularly relates to a multichannel broadband high-resolution spectrograph.

BACKGROUND

Spectrographs are also called spectrometer, and direct reading spectrometers are widely known. A device adopting a photodetector such as a photomultiplier to measure intensity of different wavelength positions of a spectrum line consists of an incident slit, a dispersion system, an imaging system and one or more exit slits. A required wavelength or wavelength region is separated out from electromagnetic radiation of a radiation source by a dispersion element, and intensity measurement is carried out on the selected wavelength (or a certain band is scanned). Two types of a monochromator and a polychromator are classified.

The monochromator is a photon energy and wavelength selector, is a basic spectrum analysis and measurement instrument and widely applied to the field of optics and photoelectron, and a grating monochromator is the most widely applied. According to a principle of grating diffraction:

$$d \sin \theta_m = m\lambda + g_0$$

In the formula, d is a groove pitch of the grating, m is a distribution angle of an m(th)-order photon with a wavelength being $\lambda$, go is a constant correlated to the design of an optical system, and when m=1, the first-order high-efficiency diffraction photon with the corresponding wavelength may be obtained at different $\theta$ angle positions.

In the design of a traditional grating monochromator, the positions of incident slits and exit slits are fixed, and a mechanical transmission device is adopted to control the $\theta$ angle of the grating to rotate so as to scan the wavelength, resulting in some defects in practical application, i.e., (1) machinery needs to control the grating to rotate to scan the grating; (2) in order to improve the wavelength resolution and the diffraction efficiency of the instrument when the monochromator works in a wide wavelength region, the grating needs to be replaced according to a working wavelength region; (3) according to the wavelength application range, at least one or even more of color filters need to filter high-order diffraction light (m>=2); and (4) only one photodetector adopted each time is difficult to meet the requirements of rapid measurement and analysis on multi-spectrum channels under the same physical and space condition.

Therefore, an independent mechanical structure and a plurality of photodetectors need to implement most current monochromator structures, bringing inconvenience to application.

SUMMARY

The objective of the present invention: aiming at the defect of the prior art, the objective of the present invention provides a multichannel broadband high-resolution spectrograph without any mechanical transmission mechanism.

The technical scheme: the multichannel broadband high-resolution spectrograph according to the present invention comprises a plurality of light source incident slits, a multichannel integrated grating, a multichannel shared two-dimensional focus imaging mirror and a two-dimensional area array detector which are sequentially disposed along a light source incident or reflection line, wherein the multichannel integrated grating consists of a plurality of sub-gratings;

each light source incident slit is used as a spectrum channel incident port, the sub-gratings is combined to form an independent integrated grating according to the number of spectrum channels, a light source entering a collimating mirror through the slits, a direction perpendicular to an incident surface is a y direction, each sub-grating is disposed along the y direction, and each sub-grating has the same diffraction angle range along an x direction in which diffraction wavelengths are distributed in the incident surface; and incident light enters the corresponding integrated gratings along each light source incident slits and then is focused by the shared two-dimensional focus imaging mirror after diffraction of the integrated grating, and diffraction light in a full-spectrum region is incident onto a focal plane of the two-dimensional area array detector for detection.

A further optimal technical scheme of the present invention is that the total number of sub-gratings is n, the n sub-gratings are combined according to the number h of spectrum channels, the number of the sub-gratings included in each independent spectrum channel is k, and k=n/h.

Optionally, the number k of the sub-gratings in each channel depends on number $\lambda$ of total broad spectrum regions and widths $\Delta\lambda_k$ of sub wavelength regions, i.e., $k=\lambda/\Delta\lambda_k$.

Optionally, a diffraction angle of each sub-grating in an x direction in which diffraction wavelengths are distributed in an incident plane is $\Delta\theta$, i.e., $$\Delta\theta_1(\Delta\lambda_1) = \Delta\theta_2(\Delta\lambda_2) = \ldots = \Delta\theta_k(\Delta\lambda_n) \qquad (1)$$

In the formula:

$$\Delta\theta_1 = \theta_2 - \theta_1, \Delta\theta_2 = \theta_3 - \theta_2, \ldots \Delta\theta_k = \theta_{k+1} - \theta_k \qquad (2)$$

$$\Delta\lambda_1 = \lambda_2 - \lambda_1, \Delta\lambda_2 = \lambda_3 - \lambda_2, \ldots \Delta\lambda_k = \lambda_{k+1} - \lambda_k \qquad (3)$$

Optionally, normal directions of each sub-grating surface are combined and disposed according to a connecting sequence of each spectrum region.

Optionally, p pixels are included on a focal plane of the two-dimensional area array detector in an x direction in which diffraction wavelengths are distributed, the number p of the pixels coincides with the number of sub wavelengths corresponding to each sub-grating and conforms to requirement of high-resolution wavelength $\Delta\lambda = \Delta\lambda_k/p$; y pixels are included in a y direction, the pixels in the y direction are divided to n regions coincides with the number of spectrum channels, a pixel region in each channel region is divided to k sub spectrum regions, the number of pixels of each sub spectrum region in the y direction is t, and t=q/n.

Optionally, the number of the light source incident slits is greater than or equal to 2, and widths of the light source incident slits are fixed or adjusted within a range from 0 millimeter to 2 millimeters.

Optionally, the two-dimensional focus imaging mirror is a bifocal tire reflecting mirror, the focal length in an x direction is f1 and in a y direction is f2, and diffraction light from a multichannel integrated grating is focused on a focal plane of a two-dimensional area array detector.

Optionally, a plurality of spherical mirrors in one-to-one correspondence to light source incident slits are further disposed between the light source incident slits and a multichannel integrated grating, and a light source enters the light source incident slits and then is reflected by the spherical mirrors to form parallel light.

Optionally, a color filter is further disposed between the spherical mirrors and the multichannel integrated grating and used for filtering high-order diffraction light.

Beneficial effects: the present invention adopts the multichannel integrated grating consisting of the plurality of gratings, no any mechanical displacement part of an element is needed, spectrum data of a plurality of channels is simultaneously measured, diffraction light with different wavelengths emitted from different gratings of the plurality of channels are focused by the bifocal tire optical mirror and imaged on the focal plane of the two-dimensional area array detector corresponding to different gratings according to the channels, thereby achieving full-spectrum, high-resolution and rapid imaging of the plurality of channels. By the present invention, design and structure of instrument are simplified, the long-term working reliability of a system is improved, and the service lifetime of the system is prolonged.

DETAILED DESCRIPTION OF EMBODIMENTS

Figure 1:
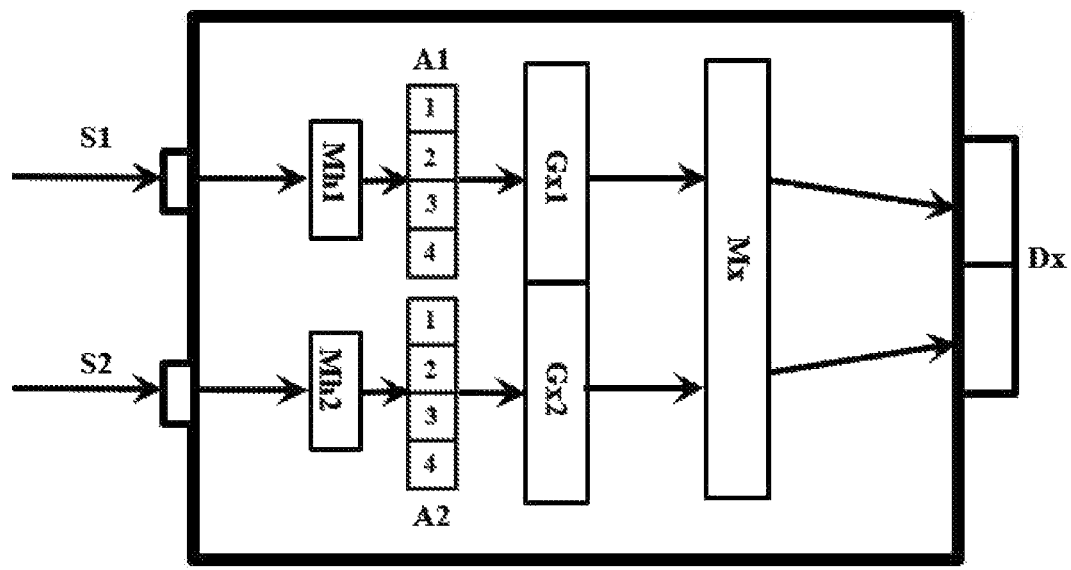
FIG. 1 is a schematic diagram of a light source incident or reflection line of a spectrograph in an embodiment.

The technical schemes of the present invention will be described in details below in conjunction with the accompanying drawings, while the protection scope of the present invention is not limited to the embodiments.

Embodiment: a multichannel broadband high-resolution spectrograph comprises a plurality of light source incident slits, spherical mirrors, a color filter, a multichannel integrated grating, a two-dimensional focus imaging mirror and a two-dimensional area array detector.

Each light source incident slit is used as a spectrum channel incident port, the sub-gratings are combined to form an independent integrated grating according to the number of spectrum channels, a light source enters a collimating mirror through the slits, a direction perpendicular to an incident surface is a y direction, each sub-grating is disposed along the y direction, and each sub-grating has the same diffraction angle range along an x direction in which diffraction wavelengths are distributed in the incident surface. The total number of the sub-gratings is n, the n sub-gratings are combined according to the number h of spectrum channels, the number of the sub-gratings included in each independent spectrum channel is k, and k=n/h. The number k of the sub-gratings in each channel depends on number λ of total broad spectrum regions and widths $\Delta\lambda_k$ of sub wavelength regions, i.e., $k=\lambda/\Delta\lambda_k$.

A diffraction angle of each sub-grating in the x direction in which diffraction wavelengths are distributed in an incident plane is $\Delta\theta$, i.e., $$\Delta\theta_1(\Delta\lambda_1)=\Delta\theta_2(\Delta\lambda_2)=\ldots=\Delta\theta_k(\Delta\lambda_n) \quad (1)$$

In the formula:

$$\Delta\theta_1=\theta_2-\theta_1, \Delta\theta_2=\theta_3-\theta_2, \ldots \Delta\theta_k=\theta_{k+1}-\theta_k \quad (2)$$

$$\Delta\lambda_1=\lambda_2-\lambda_1, \Delta\lambda_2=\lambda_3-\lambda_2, \ldots \Delta\lambda_k=\lambda_{k+1}-\lambda_k \quad (3)$$

p pixels are included on a focal plane of the two-dimensional area array detector in the x direction in which diffraction wavelengths are distributed, the number p of the pixels coincides with the number of sub wavelengths corresponding to each sub-grating and conforms to requirement of high-resolution wavelength $\Delta\lambda=\Delta\lambda_k/p$; y pixels are included in the y direction, the pixels in the y direction are divided to h regions in coincidence with the number of spectrum channels, a pixel region in each channel region is divided to k sub spectrum regions, the number of pixels of each sub spectrum region in the y direction is t, and t=q/n.

Incident light enters the corresponding integrated gratings along the light source incident slits and then is focused by the shared two-dimensional focus imaging mirror after diffraction of the integrated grating, and diffraction light in a full-spectrum region is incident onto the focal plane of the two-dimensional area array detector for detection.

Detailed description is made in the embodiment by taking a dual-channel light source passing through dual-channel incident slits S1 and S2 and having a width about 10 micrometers for example.

Figure 2:
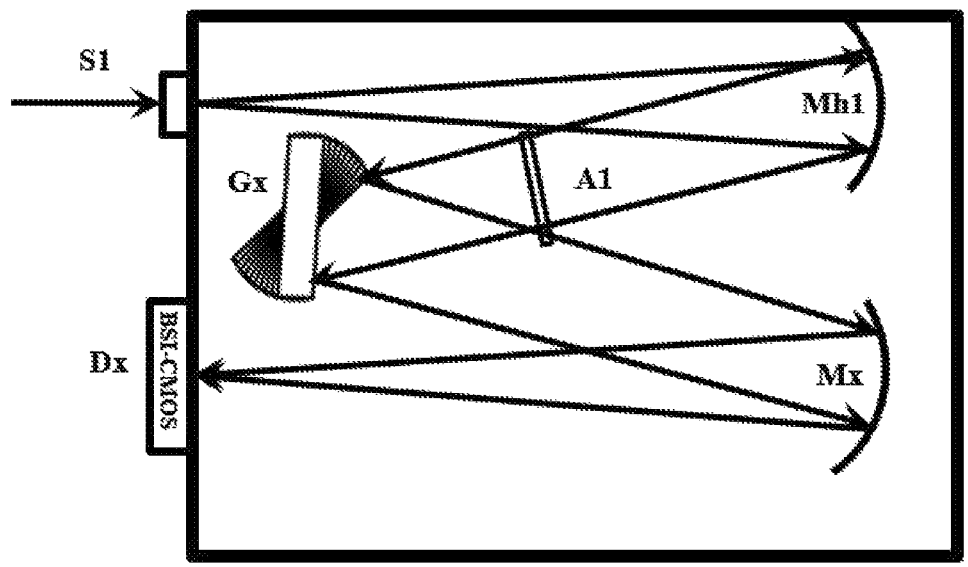
FIG. 2 is top distribution view of an optical element in a channel S1 of a spectrograph in an embodiment.

As shown in FIG. 1 and FIG. 2, M<h1> and M<h2> are two spherical mirrors and respectively correspond to the S1 and the S2, such that divergent light from the incident slits is converted to parallel light incident to the integrated grating. A1 and A2 are respectively two groups of light filters, a position 1 is empty, is not provided with the light filter and corresponds to a short-wave spectrum region, other positions 2-4 are sequentially provided with long-wave pass filters with cutoff wavelengths being 390 nanometers, 450 nanometers and 650 nanometers. The total number n of the gratings is eight, the gratings are divided to two channels, and G1 and G2 groups of integrated gratings are disposed on each channel and respectively include four sub-gratings corresponding to working wavelength regions of 200-950 nanometers. Mx is a bifocal tire reflecting mirror, the focal length f1 in a horizontal diffraction x direction is 95 nanometers and the focal length f2 in the y direction perpendicular to an incident surface is 130 nanometers, thereby promoting diffraction light of the eight gratings to be focused on the focal plane of a two-dimensional detector D. On a focal plane of a two-dimensional complementary metal-oxide-semiconductor (CMOS) detector, a first channel spectrum imaging region is disposed at an upper half part and includes four sub-spectrum regions, and a second channel spectrum imaging region is disposed at a lower half part and includes four sub-spectrum regions.

The total number n of the gratings is eight, the gratings are divided to two channels, and G1 and G2 groups of integrated gratings are disposed on each channel and respectively include four sub-gratings, each grating corresponds to one of the sub-spectrum regions, the sub-spectrum regions of each channel are 200-390 nanometers, 390-580 nanometers, 580-765 nanometers and 765-950 nanometers, which may cover the spectrum range of 200-950 nanometers in total.

A1 and A2 are two groups of light filters, a position 1 in each group is empty and not provided with a light filter, other positions 2-4 are sequentially provided with long-wave pass filters with cutoff wavelengths being 390 nanometers, 450 nanometers and 650 nanometers and capable of reliably filtering high-order diffraction light (m>=2).

Gratings of 1,200 g per nanometer (1,200 lines per millimeter) are adopted, the blaze wavelengths of the selected gratings are respectively 250 nanometers (200-390 nanometers), 500 nanometers (390-580 nanometers), 750 nanometers (580-765 nanometers) and 750 nanometers (765-950 nanometers) at different spectrum regions, thereby obtaining highest diffraction efficiency.

A Xintu Dhyana 90 UV camera and a BSI-CMOS two-dimensional detector structure are adopted, each frame of picture has data acquisition time smaller than or equal to 30 meters, 16-bit data dynamic range and working wavelength range being 200-100 nanometers and is provided with 2,048 by 2,048 pixels, the size of each pixel is 0.011*0.011 millimeter, and the size of the focal plane is 22.5*22.5 millimeters. The dual-channel spectrum respectively is provided with 2,048 by 2,048 pixels in an imaging region of the focal plane of the two-dimensional detector, each channel is provided with four sub-spectrum regions, and 2,048 (x) by 256 (y) pixels are disposed in each sub-spectrum region.

Therefore, in the design of the dual-channel spectrograph, 8,195 by 256 pixels may be disposed in the full-spectrum measurement region of each channel, and 8,192 pixels may be disposed in the diffraction x direction. The spectrograph is designed with a dispersive power of 0.1 nanometer/pixel, 7,500 pixels of the spectrum region of 200-950 nanometers are covered, 692 redundant pixels may be still remained to achieve seamless debugging and connection of each sub-spectrum zone.

In conclusion, although the present invention has been expressed and described with reference to specific preferred embodiments, it shall not be interpreted as limitation of the present invention. Various changes may be made on forms and details of the present invention without departing from the spirit and scope, defined in the appending claims, of the present invention.

What is claimed is:

1. A multichannel broadband high-resolution spectrograph, characterized by comprising a plurality of light source incident slits, a multichannel integrated grating, a multichannel shared two-dimensional focus imaging mirror and a two-dimensional area array detector which are sequentially disposed along a light source incident or reflection line, wherein the multichannel integrated grating consists of a plurality of sub-gratings;

each light source incident slit is used as a spectrum channel incident port, the sub-gratings are combined to form an independent integrated grating according to the number of spectrum channels, a light source enters a collimating mirror through the slits, a direction perpendicular to an incident surface is a y direction, each sub-grating is disposed along the y direction, and each sub-grating has the same diffraction angle range along an x direction in which diffraction wavelengths are distributed in the incident surface; and incident light enters the corresponding integrated gratings along each light source incident slit and then is focused by the shared two-dimensional focus imaging mirror after diffraction of the integrated grating, and diffraction light in a full-spectrum region is incident onto a focal plane of the two-dimensional area array detector for detection.

2. The multichannel broadband high-resolution spectrograph according to claim 1, characterized in that the total number of sub-gratings is n, the n sub-gratings is combined according to the number h of spectrum channels, the number of the sub-gratings included in each independent spectrum channel is k, and k=n/h.

3. The multichannel broadband high-resolution spectrograph according to claim 2, characterized in that the number k of the sub-gratings in each channel depends on number$\lambda$, of total broad spectrum regions and widths$\Delta\lambda_k$ of sub wavelength regions, i.e., k=$\lambda/\Delta\lambda_k$.

4. The multichannel broadband high-resolution spectrograph according to claim 3, characterized in that a diffraction angle of each sub-grating along an x direction in which diffraction wavelengths are distributed in an incident plane is $\Delta\theta$, i.e., $$\Delta\theta_1(\Delta\lambda_1)=\Delta\theta_2(\Delta\lambda_2)=\ldots=\Delta\lambda_k(\Delta\lambda_n) \tag{1}$$

In the formula:

$$\Delta\theta_1=\theta_2-\theta_1, \Delta\theta_2=\theta_3-\theta_2, \ldots \Delta\theta_k=\theta_{k+1}-\theta_k \tag{2}$$

$$\Delta\lambda_1=\lambda_2-\lambda_1, \Delta\lambda_2=\lambda_3-\lambda_2, \ldots \Delta\lambda_k=\lambda_{k+1}-\lambda_k \tag{3}$$

5. The multichannel broadband high-resolution spectrograph according to claim 4, characterized in that normal directions of each sub-grating surface are combined and disposed according to a connecting sequence of each spectrum region.

6. The multichannel broadband high-resolution spectrograph according to claim 4, characterized in that p pixels are included on a focal plane of the two-dimensional area array detector in an x direction in which diffraction wavelengths are distributed, the number p of the pixels coincides with the number of sub wavelengths corresponding to each sub-grating and conforming to requirement of high-resolution wavelength $\Delta\lambda=\Delta\lambda_k/p$; y pixels are included in a y direction, the pixels in the y direction is divided to n regions in coincidence with the number of spectrum channels, a pixel region in each channel region being divided to k sub spectrum regions, the number of pixels of each sub spectrum region in the y direction is t, and t=q/n.

7. The multichannel broadband high-resolution spectrograph according to claim 1, characterized in that the number of the light source incident slits is greater than or equal to 2, and widths of the light source incident slits is fixed or adjusted within a range from 0 millimeter to 2 millimeters.

8. The multichannel broadband high-resolution spectrograph according to claim 1, characterized in that the two-dimensional focus imaging mirror is a bifocal tire reflecting mirror, the focal length along an x direction is f1 and along a y direction is f2, and diffraction light from a multichannel integrated grating is focused on a focal plane of a two-dimensional area array detector.

9. The multichannel broadband high-resolution spectrograph according to claim 1, characterized in that a plurality of spherical mirrors in one-to-one correspondence to light source incident slits are further disposed between light source incident slits and a multichannel integrated grating, and a light source enters the light source incident slits and then is reflected by the spherical mirrors to form parallel light.

10. The multichannel broadband high-resolution spectrograph according to claim 9, characterized in that a color filter is further disposed between the spherical mirrors and a multichannel integrated grating and used for filtering high-order diffraction light.

* * * * *